(12) United States Patent
Hollenbeck et al.

(10) Patent No.: US 6,483,265 B1
(45) Date of Patent: Nov. 19, 2002

(54) METHODS AND SYSTEMS FOR MINIMIZING VIBRATION IN ELECTRIC MACHINES

(75) Inventors: Robert K. Hollenbeck; David M. Erdman, both of Fort Wayne, IN (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/576,851

(22) Filed: May 23, 2000

(51) Int. Cl.[7] .................... B23Q 35/00; G05B 19/042
(52) U.S. Cl. .................... 318/162; 318/163; 318/448; 388/904; 388/907.5
(58) Field of Search .................. 318/162, 163, 318/430, 431, 460, 448, 611, 702; 388/904, 907.5

(56) References Cited

U.S. PATENT DOCUMENTS

| 4,253,053 A | * | 2/1981 | Ray et al. | ............... 318/701 |
| 4,868,477 A | * | 9/1989 | Anderson et al. | ........... 318/696 |
| 5,461,295 A | * | 10/1995 | Horst | .................... 318/701 |
| 5,742,139 A | * | 4/1998 | Kolomeitsev | ............... 318/254 |
| 5,973,462 A | * | 10/1999 | Kalpathi et al. | ............. 318/254 |
| 6,014,003 A | * | 1/2000 | French | ..................... 318/701 |
| 6,016,044 A | * | 1/2000 | Holdaway | ................. 318/696 |
| 6,242,874 B1 | * | 6/2001 | Kalpahti et al. | ............. 318/254 |

* cited by examiner

*Primary Examiner*—Bentsu Ro
(74) *Attorney, Agent, or Firm*—Karl A. Vick, Esq.; Armstrong Teasdale LLP

(57) ABSTRACT

Methods and apparatus for minimizing electrical machine vibration are described. In an exemplary embodiment of the method, power is applied to the motor under microprocessor control such that a pulse modulated current profile is applied to the motor which in turn controls the amount of torque generated by the motor. By adjusting current profiles, torque generation is controlled, and vibration and noise are eliminated.

20 Claims, 5 Drawing Sheets

METHODS AND SYSTEMS FOR MINIMIZING VIBRATION IN ELECTRIC MACHINES

BACKGROUND OF THE INVENTION

This invention relates generally to dynamo-electric machines and, more particularly, to processes for reducing vibration in motors during start-up and operation.

Electric motors are used in countless varieties and applications worldwide. Typically, torque generated at a rotor, which supplies the rotational force, is the product of current applied to the motor and an electromotive force generated by the application of a voltage to the coils of the motor. Motors generate torque in order to do work, that is, typically to drive a load.

In some applications, depending upon motor mounting or other factors, the generated torque, together with the load, may cause a motor to vibrate and generate noise as the motor begins to move its load. One example of such an application is where the motor is driving a fan as its load. Imbalances in the fan combined with torque pulses produce vibrations which are conducted to the motor and fan mounting, producing undesirable noise. Damping systems are typically employed to minimize the effects of the vibrational energy induced into the motor and fan system. Such damping system are expensive and tend to deteriorate over time due to exposure to the elements and continued exposure to vibrational energy, leading to loosened motor and fan assemblies, potentially leading to failures of the motor or the fan.

In some applications, the problem is most prevalent at startup. However, once the motor is up to speed however, the noise and vibrations lessen or disappear. In many applications, the motor generated noise and vibrations at startup are undesirable. In other applications, such as the fan example described above, the noise and vibration problems are always present. It would be desirable to control motor startup and operation to eliminate the problem of high torque vibration and noise, allowing the possibility of eliminating damping systems, and reducing costs.

BRIEF SUMMARY OF THE INVENTION

In an exemplary embodiment, a motor control system includes a microprocessor programmed to apply current to an electrical motor. The microprocessor pulse width modulates the current so that reductions in peak currents and the filtering of fundamental frequencies reduce the amount of torque generated by the motor. Reductions in torque reduce vibrations and noise of the motor thereby allowing reductions or elimination of damping systems. The method for minimizing electrical machine vibration includes the steps of applying power to the motor under microprocessor control such that a pulse width modulated current profile is applied to the motor.

DETAILED DESCRIPTION OF THE INVENTION

Figure 1:
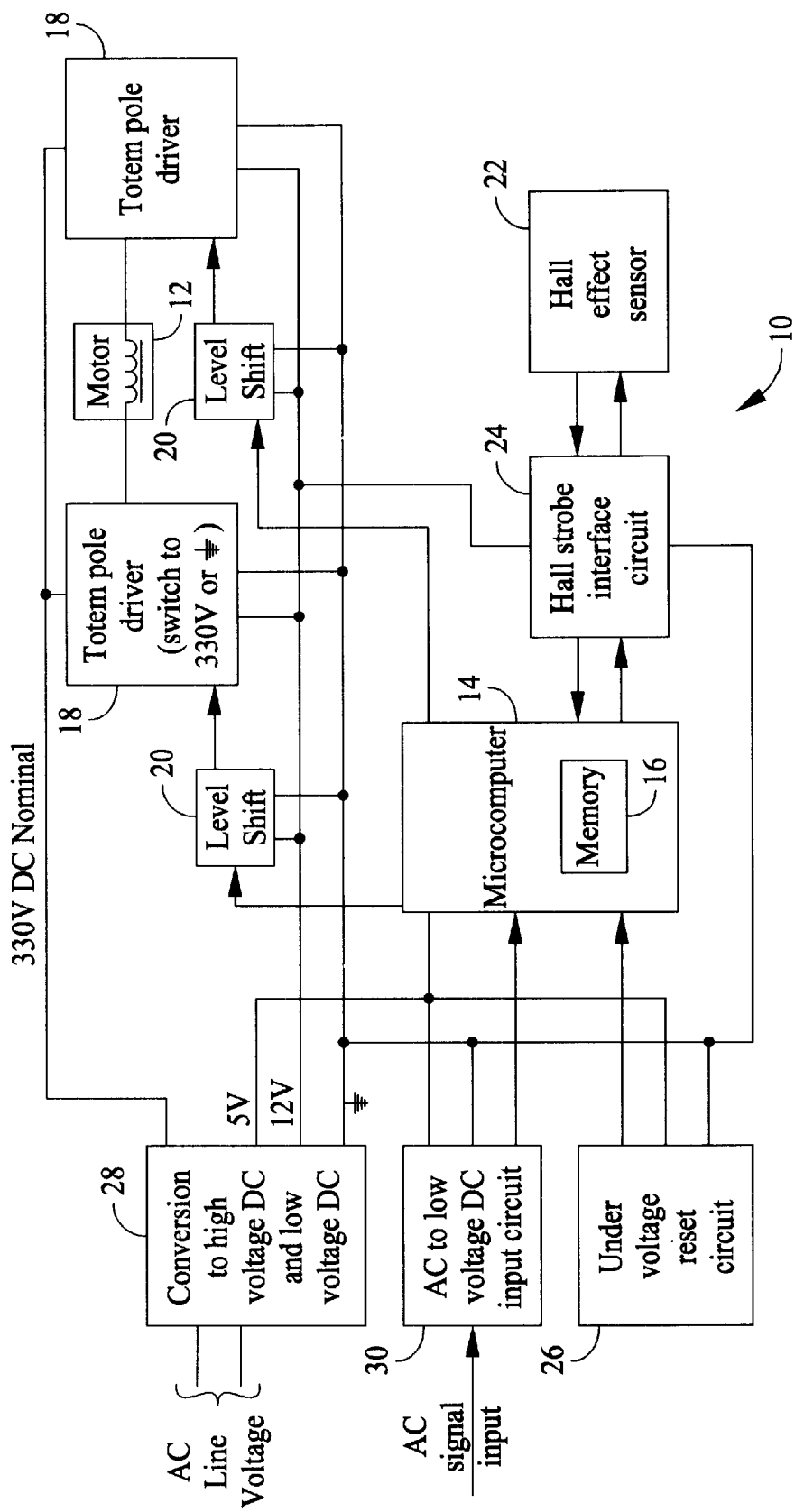
FIG. 1 is an exemplary embodiment of an electric machine vibration reduction system.

FIG. 1 shows a block diagram of a motor control system 10, according to one embodiment of the present invention. System 10 includes a motor 12, a microprocessor 14, a memory 16, which can be internal or external to microprocessor 14, motor driver circuits 18, level shifting logic 20, a hall effect sensor 22, and a strobe circuit 24. As used herein, microprocessor 14 refers to controllers and processors, including microcontrollers, programmable logic controllers, input/output controllers, reduced instruction set circuits, application specific integrated circuits, logic circuits, and any other circuit, processor or microcomputer capable of processing the embodiments described herein. System 10 further includes an undervoltage reset circuit 26, a power supply circuit 28, and an input circuit 30. As described in more detail below, memory 16 is configured with an algorithm, described in more detail below, which when executed by microprocessor 14, control the time and duration which driver circuits 18 supply current in a current profile to motor 12. Hall effect sensor 22 and strobe circuit 24 provide feedback to microprocessor 14 on the rotor position of motor 12 for controlling the algorithm.

The processes described below alternatively can be implemented, for example, in a personal computer programmed to execute each described step. The processes, however, can be implemented in many different manners and are not limited to being implemented and practiced on a personal computer. For example, the processes could be implemented in a server and accessed via a network, such as a local area network and/or a wide area network.

Motors typically are configured to satisfy specific performance requirements measured at several steady state operating points. The performance requirements include rated operating point torque, current, slip, power factor, and efficiency, pullout (breakdown) torque, locked rotor torque and current, and no-load current.

Figure 2:
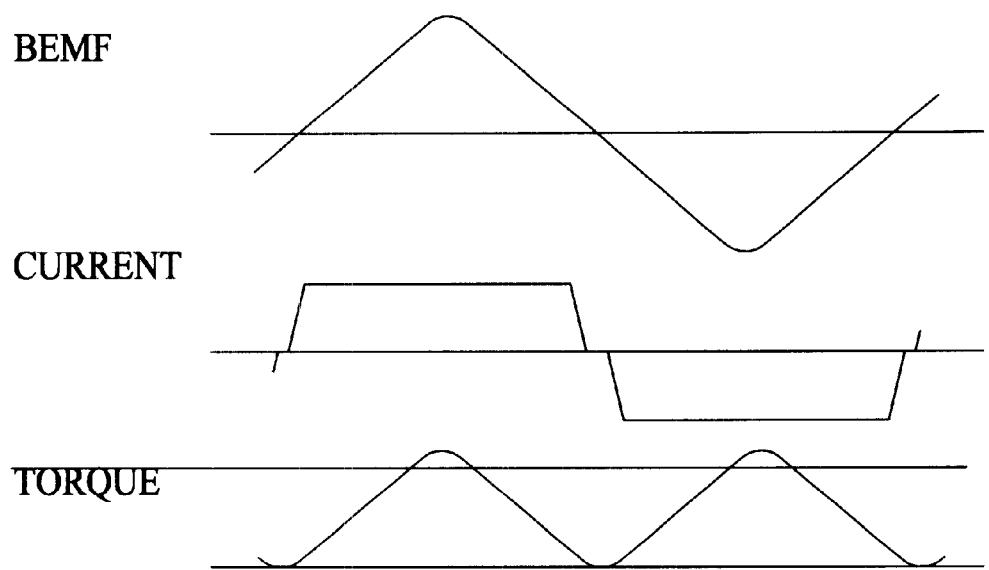
FIG. 2 is a chart showing back electromotive force, current, and torque waveforms for one known motor control system.

Torque of brushless DC motors and electronically commutated motors (ECM) is equal to the product of motor current and a back electromotive force (EMF) multiplied by a constant which represents losses present in the motor. FIG. 2 illustrates motor torque, motor current, and a back EMF of one known motor control system using waveforms 50. As shown in FIG. 2, a torque waveform 52 is the product of a motor current waveform 54 and a back EMF waveform 56. As torque reaches a particular level, which is different in each motor and for each motor application, shown as peaks 58 in torque waveform 52 in FIG. 2, vibrations in the motors or the mountings are induced.

Figure 3:
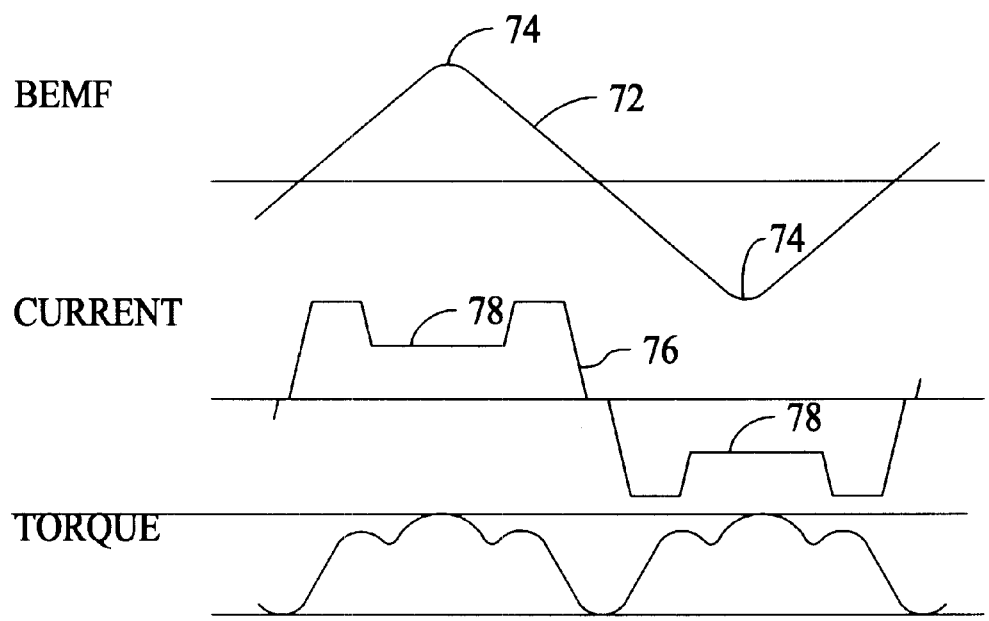
FIG. 3 is a chart showing back electromotive force, current, and torque waveforms for a motor control system according to one embodiment of the present invention.

FIG. 3 shows waveforms 70 where current has been limited using a motor control system 10 (shown in FIG. 1) configured with an algorithm to limit motor current during periods of peak back EMF. Back EMF waveform 72 shows a typical back EMF sinusoid and its associated peaks 74. Current waveform 76, which is generated using system 10 is pulse width modulated so that periods of current reductions 78 occur during periods of peak back EMF. As used herein pulse width modulation includes repetitive pulse control, missing pulse waveforms, and variable width pulse waveforms. A torque waveform 80 is shown which represents a product of back EMF waveform 72 and current waveform 76. As a result of current reductions 78, the torque waveform 80 becomes more constant than torque waveform 52 (shown in FIG. 2) since a fundamental frequency of the torque is reduced and therefore motor vibrations are decreased.

Figure 4:
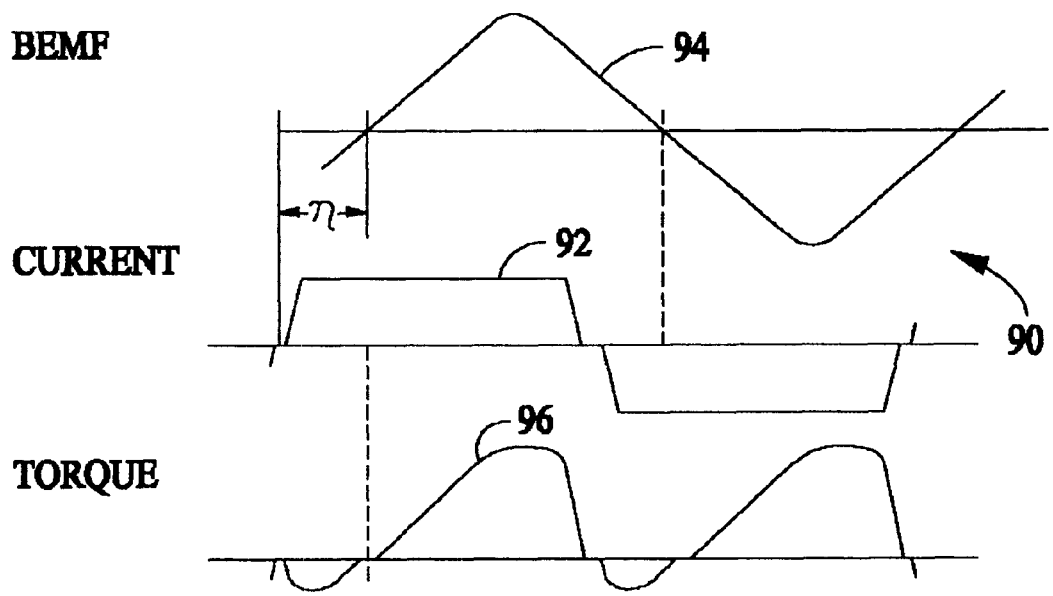
FIG. 4 is a chart showing back electromotive force, current, and torque waveforms for a motor control system according to a second embodiment of the present invention.

FIG. 4 shows waveforms 90 depicting another embodiment of the present invention. A current waveform 92, generated by system 10 (shown in FIG. 1) is shown as leading a back EMF waveform 94 by n electrical degrees. Leading angle n is determined by the configuration of system 10 and by inductance of the motor. By changing the timing of current waveform 92 with respect to back EMF waveform 94 shaping and timing of torque waveform 96 is accomplished. In the embodiment depicted in FIG. 4, advancing the current waveform 92 causes more motor torque to be generated at higher speeds, but also generates negative torque pulsations.

Figure 5:
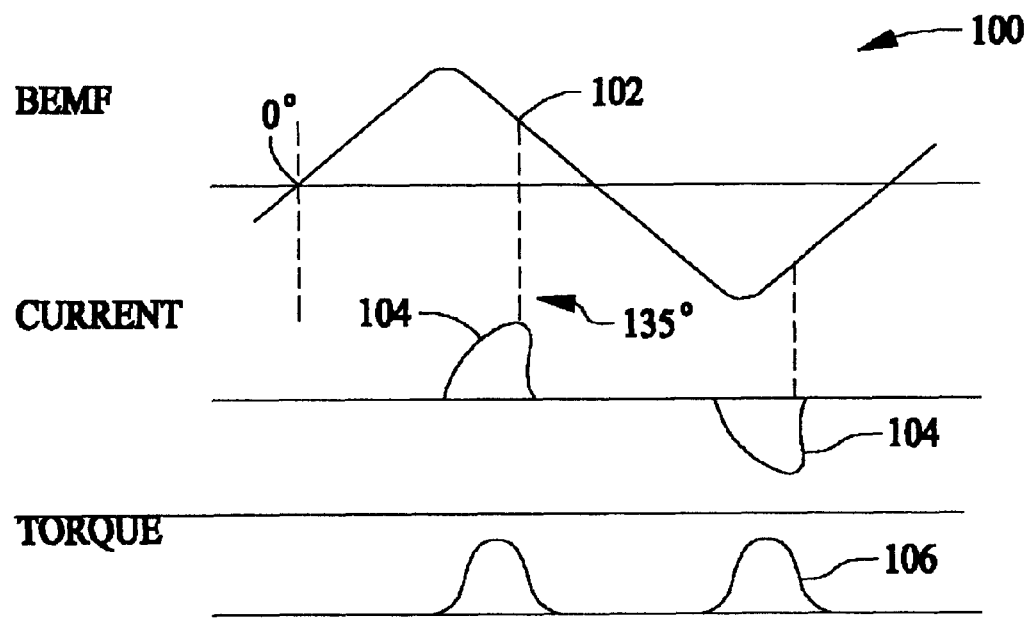
FIG. 5 is a chart showing back electromotive force, current, and torque waveforms for a known motor control system.

FIG. 5 shows waveform 100 of a known system configured so that current is removed from a motor at 135 electrical degrees of a 180 degree back EMF waveform 102. Current pulses are as shown by current waveform 104. By controlling an amount of time a current pulse is applied to a motor, a torque waveform 106 is controlled.

Figure 6:
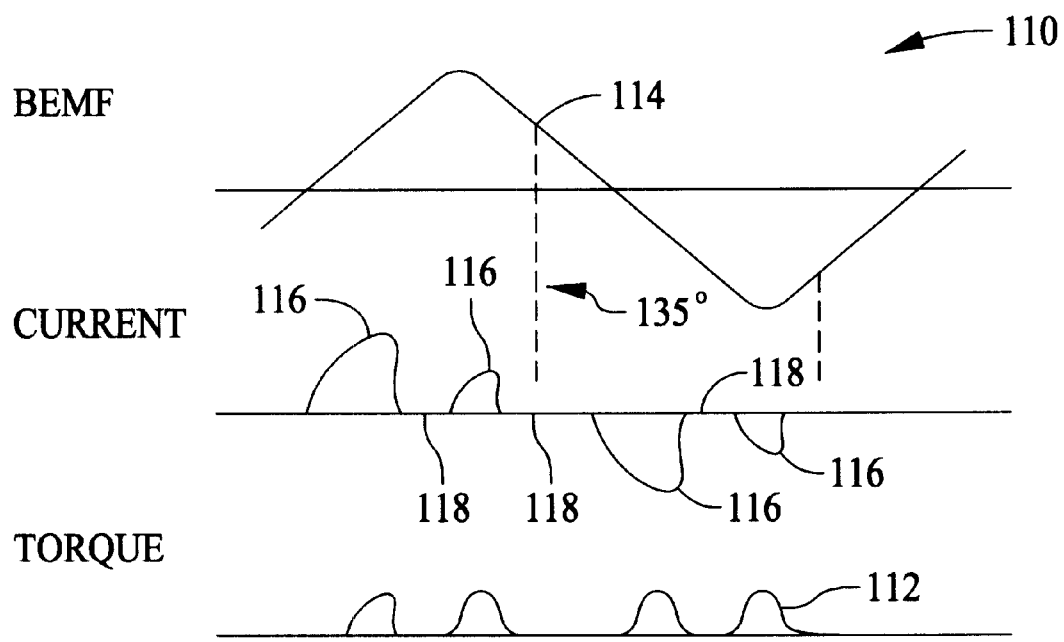
FIG. 6 is a chart showing back electromotive force, current, and torque waveforms for a motor control system according to a third embodiment of the present invention.

FIG. 6 shows waveform 110 including a torque waveform 112 according to another embodiment of the present invention. Instead of having a fixed time without current, as described by the system depicted in FIG. 5, for a portion of a back EMF waveform 114, system 10 is configured to provide multiple current pulses 116 during the back EMF waveform 114, and also multiple no current times 118, resulted in a reduced peak torque. In addition the amount of current in pulses 116 control torque level. As shown in FIG. 6, current pulses 116 are lower in amplitude during periods of higher back EMF, as shown on waveform 114, thereby resulting in uniformity in amplitude of torque pulses 112.

Figure 7:
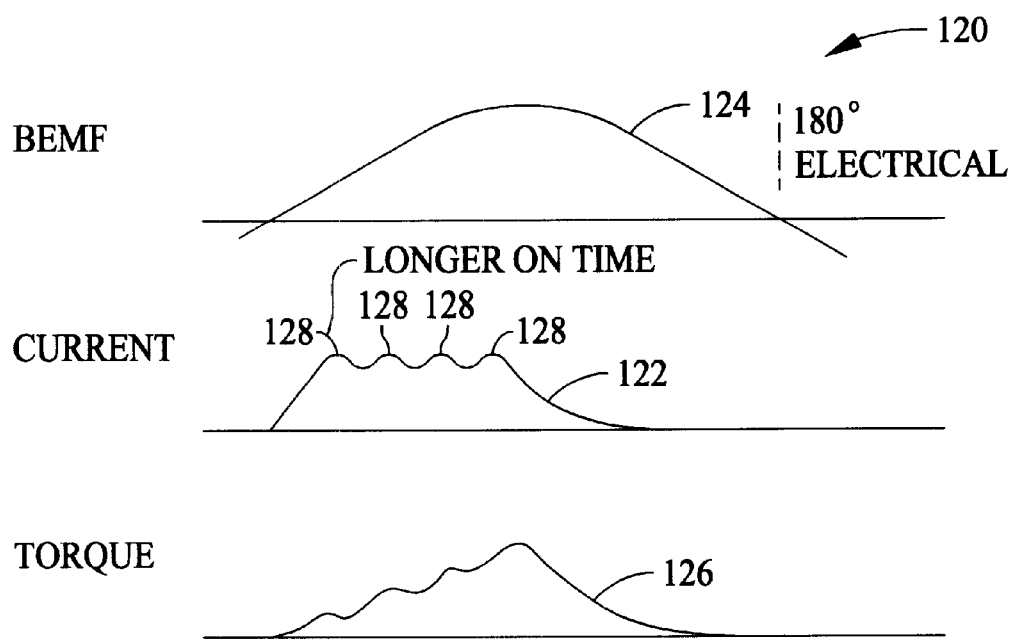
FIG. 7 is a chart showing back electromotive force, current, and torque waveforms for a motor control system according to a fourth embodiment of the present invention.

FIG. 7 shows one embodiment including waveforms 120 where system 10 is configured to provide a pulse width modulated current waveform 122 that is on for a longer period of a back EMF waveform 124, thereby resulting in a torque waveform 126 with a high peak value. As shown in FIG. 7, waveform 122 includes multiple current pulses 128 during a period of positive back EMF, shown on waveform 124.

Figure 8:
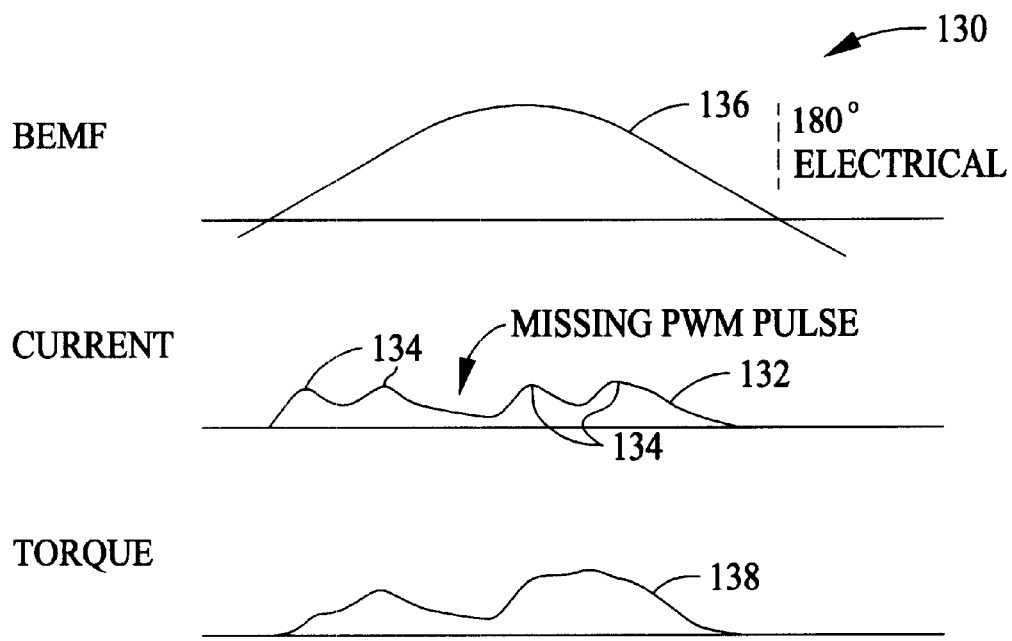
FIG. 8 is a chart showing back electromotive force, current, and torque waveforms for a motor control system according to a fifth embodiment of the present invention.

Referring now to FIG. 8 waveform 130 include a current waveform 132 constituting current pulses 134. As shown in FIG. 8, system 10 has been configured so that one of the modulated current pulses 134 is missing from waveform 132. By removing a current pulse 134 from waveform 132, the current waveform can be on for a longer portion of back EMF waveform 136 while still reducing an amount of peak torque as shown in torque waveform 138.

While the invention has been described in terms of various specific embodiments, those skilled in the art will recognize that the invention can be practiced with modification within the spirit and scope of the claims.

What is claimed is:

1. A method of controlling vibration of a motor using a motor control system wherein the motor control system includes a microprocessor, a memory coupled to the microprocessor, a driver circuit coupled to the motor and the microprocessor, and a motor control program including a current profile stored in the memory, said method comprising the steps of:

configuring the motor control system such that the microprocessor executes the motor control program including the current profile and controls the driver circuit;

modifying motor current such that a fundamental frequency component of a torque pulse is reduced compared with torque pulse harmonics; and applying the current profile to the motor.

2. A method according to claim 1 wherein said step of configuring the motor control system further comprises the step of configuring a motor control system to control motor current.

3. A method according to claim 2 wherein said step of configuring a motor control system to control motor current further comprises the step of applying a motor current leading a back electromotive force by n degrees.

4. A method according to claim 2 wherein said step of configuring the motor control system to control current further comprises the step of configuring a motor control system to pulse width modulate motor current.

5. A method according to claim 4 wherein said step of configuring a motor control system to pulse width modulate motor current further comprises the step of adjusting pulse width modulation frequency and inductance such that a higher peak to average current is applied to the motor over a desired conduction angle.

6. A method according to claim 5 wherein said step of configuring the motor control system further comprises the step of configuring the motor control system with missing pulse width modulation pulses to reduce motor output torque.

7. A method according to claim 1 wherein said step of configuring the motor control system further comprises the step of advancing motor current angles to increase motor output torque.

8. A method according to claim 1 wherein said step of configuring the motor control system further comprises the step of reducing an amount of time current is applied to the motor.

9. A method according to claim 1 wherein said step of configuring the motor control system further comprises the step of scheduling pulse width modulation pulses.

10. A method according to claim 9 wherein said step of scheduling pulse width modulation pulses further comprises the step of generating at least one current pulse during one cycle of a back electromotive force waveform.

11. A motor control system configured for reducing vibrations and noise in electric motors, said system comprising:

a microprocessor;

a memory coupled to said microprocessor;

a driver circuit coupled to said electric motor and said microprocessor; and a motor control program stored in said memory and configured to be executed by said microprocessor, said motor control program configured to modify motor current such that a fundamental frequency component of a torque pulse is reduced compared with torque pulse harmonics.

12. A motor control system according to claim 11 wherein said motor control program is configured to control motor current.

13. A motor control system according to claim 12 wherein said motor control program is configured to pulse width modulate motor current.

14. A motor control system according to claim 13 wherein said motor control program is configured with a pulse width modulation frequency to match with a motor inductance such that a higher peak torque is generated relative to current over a desired conduction angle.

15. A motor control system according to claim 14 wherein said motor control program is configured with missing pulse width modulation pulses to reduce motor output torque pulsations.

16. A motor control system according to claim 12 wherein said motor control program is configured to supply a motor current to said motor, said motor current leading a back electromotive force by n degrees.

17. A motor control system according to claim 11 wherein said motor control program is configured to advance motor current angles to increase motor output torque.

18. A motor control system according to claim 11 wherein said motor control program is configured to schedule pulse width modulation current pulses.

19. A motor control system according to claim 18 wherein said motor control program is configured to generate at least one current pulse during one cycle of a back electromotive force waveform.

20. A motor control system according to claim 11 wherein said motor control program is configured to reduce an amount of time current is applied to the motor.

* * * * *